May 15, 1928. 1,670,198
W. G. HUXTABLE ET AL
APPARATUS FOR FORMING AND SECURING WIRE HINGES
IN METAL BOXES AND BOX PARTS
Filed May 24, 1926 4 Sheets-Sheet 1
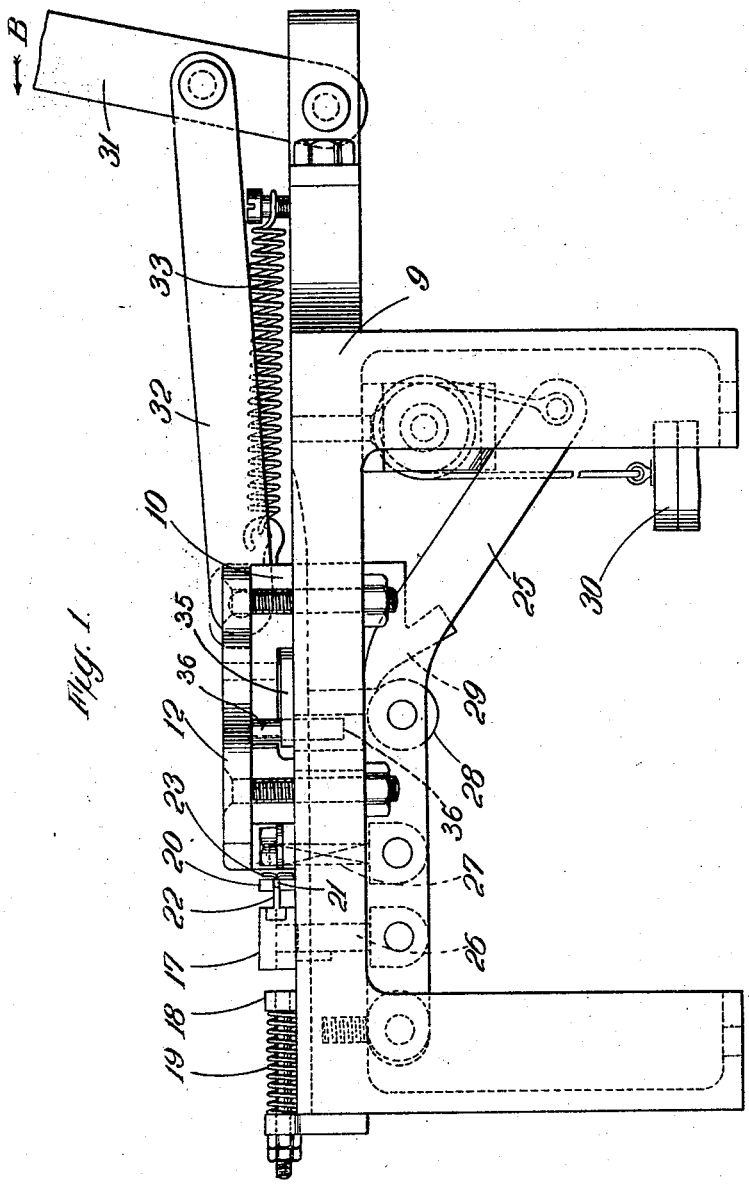

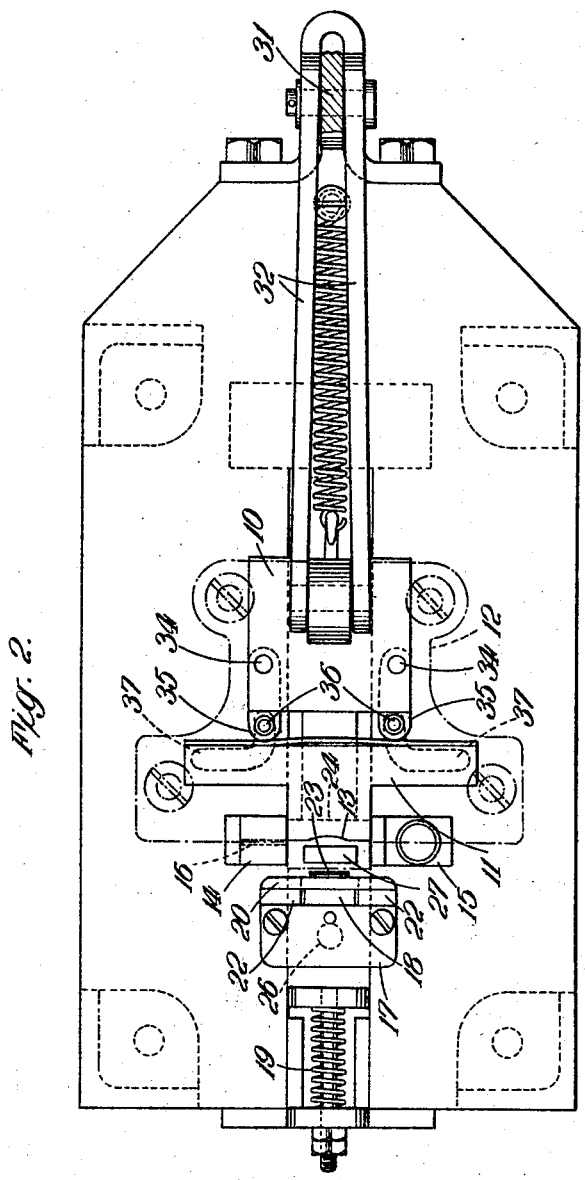

May 15, 1928. 1,670,198
W. G. HUXTABLE ET AL
APPARATUS FOR FORMING AND SECURING WIRE HINGES
IN METAL BOXES AND BOX PARTS
Filed May 24, 1926 4 Sheets-Sheet 3
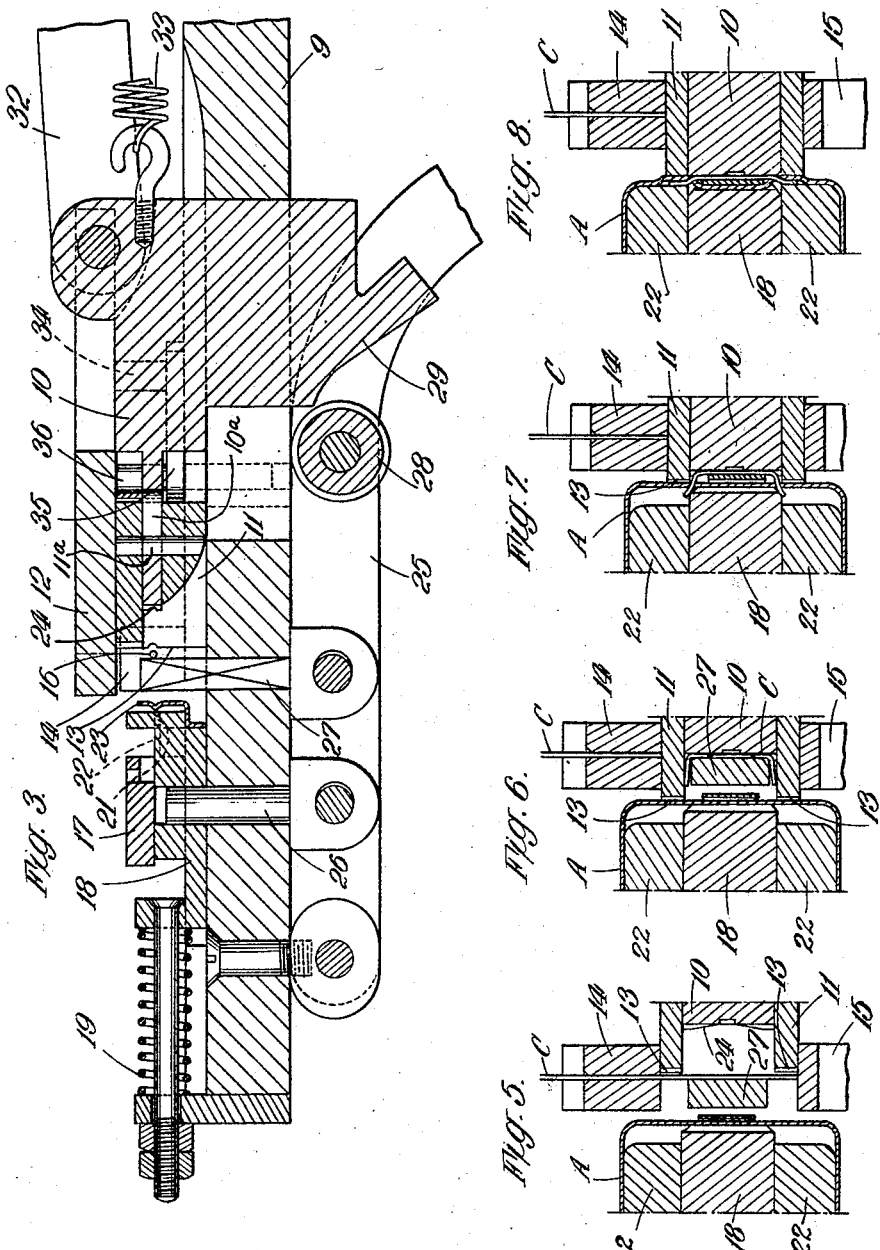

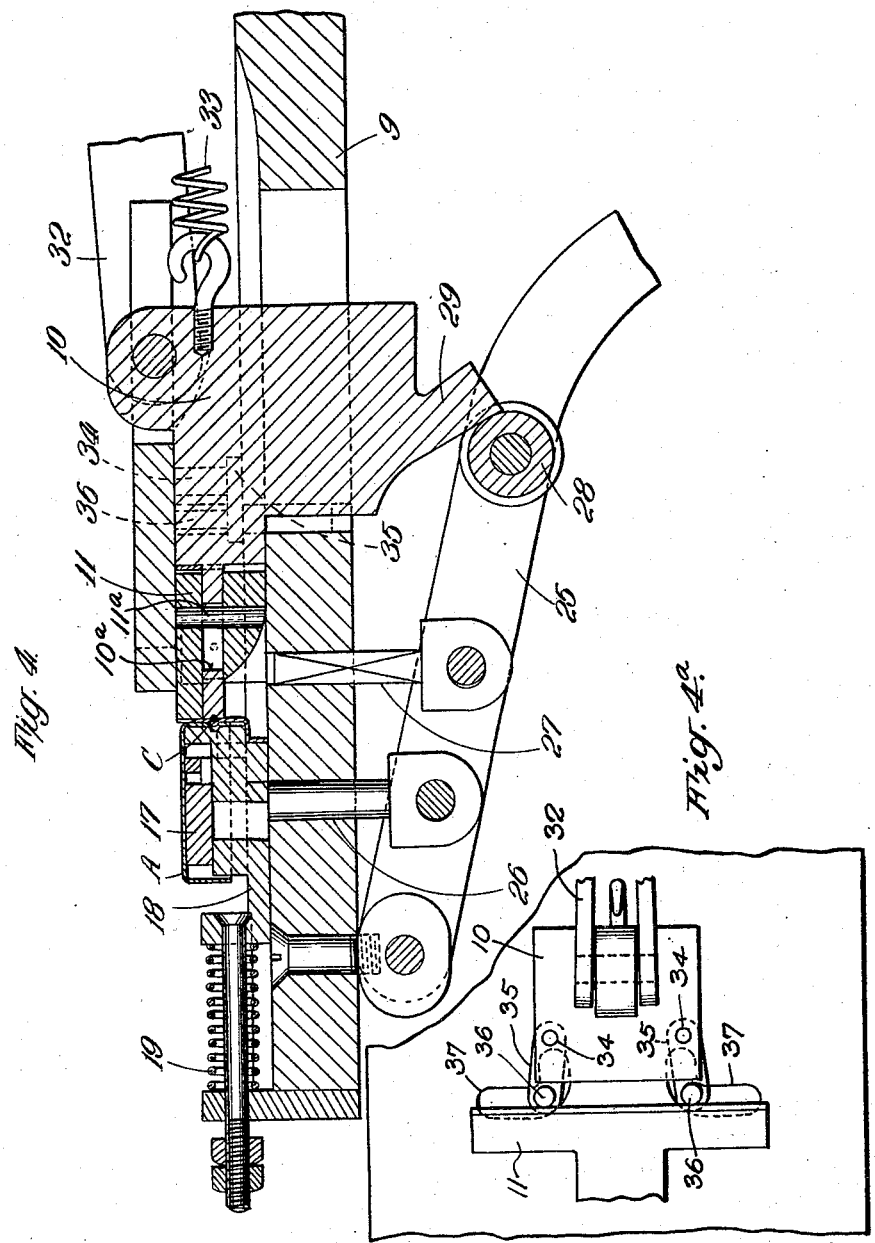

Patented May 15, 1928.

1,670,198

UNITED STATES PATENT OFFICE.

WILLIAM GEORGE HUXTABLE AND REGINALD ERNEST GOLD, OF SWANSEA, WALES.

APPARATUS FOR FORMING AND SECURING WIRE HINGES IN METAL BOXES AND BOX-PARTS.

Application filed May 24, 1926. Serial No. 111,434, and in Great Britain May 27, 1925.

This invention relates to apparatus for forming and securing wire hinges in metal boxes and box parts and to apparatus for use in that type of hinging wherein the wire hinge is inserted through holes made in a box body, for example, and a lid or part is then attached by passing a flange thereon between the hinge and the box and bending it over on to the hinge. Heretofore, wire hinges of the above kind have been applied by a series of separate operations, some performed by hand and others in separate machines. For example, the wire has been cut to the desired length, by hand or machine, the requisite holes punched in the box by another machine and the ends of the cut wire inserted in the holes by hand, the flange of the lid being subsequently bent over by hand or by a further machine. It will be understood that the present invention is not restricted to the hinging of metal boxes and box parts, but may be used to hinge together metal parts of various kinds.

According to the present invention, a hinge is formed from a length of wire and its ends forced through the box or part, without previously piercing the box or part. The ends of the hinge are then clenched and secured. Preferably the whole of the operations of cutting the wire, forming it into a hinge, forcing it into the box or part and securing it are performed in a single apparatus and in one operation of the apparatus.

The preferred apparatus comprises means for cutting a length of wire to correct length to form a hinge, means for bending the ends of the cut wire, means for forcing the bent ends through the box or part, means for bending or clenching the ends against the box or part and means for forming lugs on the box or part for holding the hinge in position and, if desired, for forming an indentation to allow clearance for the lid or the like.

A suitable apparatus for carrying out the invention comprises a base on which a box holder and two slides are mounted, together with the necessary operating mechanism. One of the slides serves to cut the wire, to shape it, and to hold it in position for forcing through the box and to assist in forming the necessary lugs for holding the hinge in position, the other slide serving to force the wire through the box. The box holder also carries a further slide which assists in the piercing of the box by the wire and also in the clenching of the wire ends against the box.

The apparatus may be operated by hand, pedal or by power.

To enable the invention to be fully understood it will now be described by reference to the accompanying drawings in which:—

Fig. 1 is a side elevation of one form of apparatus suitable for carrying out the invention, and Fig. 2 is a plan view thereof with the top plate removed;

Fig. 3 is a sectional elevation of a portion of the apparatus with the parts in the position shown in Fig. 1 and drawn to a larger scale, and Fig. 4 is a view similar to Fig. 3 but with the parts in position at the finish of the operation of forming and attaching a hinge to a box;

Fig. 4$^a$ is a plan view of a portion of the machine with the top plate removed.

Figs. 5–8 inclusive are sectional views shewing the various stages of operation of the apparatus.

As shown, the apparatus comprises a slotted base plate 9 on which are arranged two slides 10, 11 mounted in the slot for independent and combined movement and adapted to co-operate with a box holder as hereinafter described. A cover plate 12 is fitted over the slides and the end 13 of the slide 11 is shaped to cut the wire and to form it into the required shape for a hinge and also to assist in forming the lugs as hereinafter described. Adjacent to the end of the slide 11 two stops 14, 15 are secured to the base, the stop 14 having a hole 16 therein to receive the necessary wire, and the stops being spaced to cut the wire into the correct length to be used.

A guide pin 11$^a$, mounted in the slide 11, projects through a slot 10$^a$ in the slide 10.

The box holder consists of a block 17 secured to the base over which a box A is placed (Fig. 4) and through which works a slide 18 against a spring 19, as shown. The slide 18 carries a cross-piece 20 slotted at 21 to receive two thin projections 22 on the block 17 and at the centre of the cross-piece a projecting spacer 23 is mounted for providing the necessary clearance between the inside edge of the wire and the box body and also for assisting in forming the indentation in the box.

The end 24 of slide 10 is shaped to hold the wire in position when piercing the box. Beneath the base plate a lever 25 is pivoted carrying pivoted stops 26, 27 which project upwards through openings in the base into the paths of the various slides. A roller 28 on the lever 25 engages a cam 29 on the underside of the slide 10 and the lever is normally held in operative position by a weight 30, as shown in Fig. 1.

For operating the apparatus a lever 31 is pivoted to one end of the base and is linked to the slide 10 by links 32, the slide 10 being held by a spring 33. Thus if the lever 31 be pressed in the direction of the arrow B, Fig. 1, the slide 10 will be moved towards the box holder and, when the pressure is released, the slide will be returned by the spring 33.

As shewn in Fig. 2, the slide 10 is mounted upon pins 34 carried in links 35, the latter having pins 36 thereon which move in slots 37 in the base plate. The pins 34 are pivotally mounted in the slide and the slots 37 are substantially L shaped.

With this arrangement the pins 36 bear on the slide 11 so that the slides 10 and 11 can be advanced together towards the box holder until the slide 11 is checked by the box. At this point the pins 36 pass into the right-angled portions of the slots 37, allowing the slide 10 to continue its movements alone. This position of the pins 36 is shewn in Fig. 4ª.

The operation of the above-described apparatus is as follows:—

A box body A is placed over the holder 17 with its edge behind the spacer 23 (Fig. 4) and a wire C is fed through the hole 16 in stop 14 until it meets the stop 15 (Fig. 5), the stops 26, 27 being in the position shewn in Figs. 1 and 3.

The lever 31 is then moved in the direction of the arrow B, Fig. 1. This causes the slides 10, 11 to move towards the box, the end 13 of slide 11 cutting off the wire and bending it round the stop 27 which is rectangular in cross-section and acts as a former (Fig. 6), the end 24 of slide 10 meeting the cut wire. The motion of the slide 11 is now arrested by the box and the pins 36 having entered the right-angled portions of the slots 37 (Fig. 4ª), further movement of the lever 31 causes the slide 10 to move forward and at the same time the cam 29 depresses the lever 25 and withdraws the former 27, the stop 26, however, remaining in position and holding the slide 18 of the holder against movement. As the slide 10 moves it carries the shaped wire and on reaching the box, in conjunction with the stationary slide 18, forces the ends of the wire through the box (Fig. 7). The ends of the wire pass through the box and through the slots 21 in the cross-piece 20 into engagement with the projections 22 on the block 17. The slots 21 are shaped to slightly spread the ends of the wire apart for the final clenching operation against the projections 22, as shewn in Fig. 7. Further movement of the lever 31 causes the stop 26 to be withdrawn (Fig. 4) allowing the slide 18 to move back against its spring, the two slides 10, 11 moving together again as the end of the slot 10ª engages the pin 11ª and performing the final clenching operation, bending the ends of the wire against the stationary projections 22. At the same time the lugs or upset portions 40 in the box body for securing the hinge are formed by the cooperation of the end 13 of slide 11 and the block 17 and also if desired the usual indentation 41 to allow clearance for the lid (Fig. 8).

It will be understood that all the above operations take place during one operating stroke of the lever 31. When the lever is released the various parts return automatically to the position shewn in Fig. 1, ready for further operation. The wire may be fed into the apparatus by hand or by any suitable mechanical means from a reel or not as desired.

The ends of the various slides and the spacer piece may be shaped to form any desired lugs, upsets or indentations on the box during the operation.

Obviously, the apparatus may be adapted for metal boxes of various sizes and also for forming and securing hinges in metal parts other than boxes.

Having thus described the nature of our said invention and the best means we know of carrying the same into practical effect, we claim:—

1. In a hinging machine for metal boxes and in combination, a base plate having a slot therein, a work holder, two slides mounted in the slot in the base plate for independent and combined movement, means for reciprocating the slides, a wire holder, a lever pivoted beneath the base plate, stops pivoted on the lever, one stop being shaped as a wire former, the base plate having openings through which the stops are projectible into the paths of the slides, and means carried by one of the slides for operating the lever to move the stops.

2. In a hinging machine for metal boxes and in combination, a base plate having a slot therein, a work holder, a block secured to the base, a slide in said block, means normally resisting movement of the slide, two slides mounted in the slot in the base plate for independent and combined movement, means for reciprocating the slides, a wire holder, a lever pivoted beneath the base plate, pivoted stops on the lever, one stop being shaped to act as a wire former, the base plate having openings through which the stops normally project into the paths of the slides, and means carried by one of the slides for actuating the lever to withdraw said stops.

3. In a hinging machine for metal boxes and in combination, a base plate having a slot therein, a work holder block secured to the base, a slide in said block, means normally resisting movement of the slide, two slides mounted in the slot in the base plate for independent and combined movement, means for reciprocating the slides, two spaced stops on the base plate between which a wire may be fed and which determine the correct length of wire to be used, one of said stops acting as a wire holder, a lever pivoted beneath the base plate, stops associated with the lever, one of the last-named stops being shaped to act as a wire former, the base plate having openings through which the last-named stops normally project into the paths of the slides, and means operable by the movement of the slides for actuating the lever to withdraw the last-named stops.

4. In a hinging machine for metal boxes and in combination, a base plate having a slot therein, a work holder block secured to the base, a slide in said block, means normally resisting movement of the slide, a slotted cross piece on said slide, a spacing member on the cross piece, said block having projections adapted to enter the slots in the cross piece, a wire holder, a wire former movable into and out of position between said wire holder and said spacing member, two slides mounted in the slot in the base plate for independent and combined movement, one slide having an end shaped to cut a wire held by said holder and bend it around said former, means for reciprocating said last-named slides, a stop movable into and out of engagement with said first-named slide, and means normally holding said former and said stop in operative position, said holding means comprising means operable by the movement of said last-named slides in one direction to move said former and said stop out of operative position.

5. In a hinging machine for metal boxes and in combination, a base plate having a longitudinal slot and a pair of substantially L-shaped slots in advance of said longitudinal slot, a work holder block secured to the base, a slide in said block, means normally resisting movement of said slide, a slotted cross piece on said slide, a spacing member on the cross piece, the block having projections adapted to enter the slots in the cross piece, a pair of superposed slides movable in the slot in the base plate, links pivotally mounted on the underside of the upper one of said pair of slides, pins carried by said links, each of said pins having one end working in one of the L-shaped slots in the base plate and its other end engaging the other of said pair of slides, yieldable means normally holding said upper slide in retracted position, means for moving said uppermost slide forwardly, a wire holder, a lever pivoted beneath the base plate, stops carried by said lever, the base plate having openings through which said stops project into the path of movement of said slides, means normally holding said lever in position with one of said stops in engagement with said first-named slide, and means for depressing said lever as the superposed slides are reciprocated.

6. In a hinging machine for metal boxes, a base plate having a longitudinal slot and a plurality of substantially L-shaped slots, a work holder block secured to the base, a slide in said block, yieldable means normally resisting movement of said slide, a cross piece on said slide having substantially longitudinal slots shaped to guide the ends of a wire hinge forced therethrough, a spacing member on the cross piece, said block having projections adapted to enter the slots in the cross piece for clinching the ends of the wire, two superposed slides mounted in the longitudinal slot in the base plate, a former movable into and out of position between said first-named slide and said last-named slides, one end of the lower slide being shaped to cut and bend a wire round said former and cooperative with the work holder to suitably shape a box supported by the work holder, one end of the upper slide being shaped to force the bent wire into the work, links pivotally mounted on the underside of the upper of said superposed slides, a pin carried by each of said links bearing against the lower of said superposed slides and working in one of the L-shaped slots in the base plate, means for reciprocating the upper slide, spring means associated with the upper slide and the base plate and normally preventing movement of said slide, a wire holder, a lever pivoted beneath the base plate, stops carried by the lever, the base plate having openings through which the stops project, means normally holding said lever in raised position with one of said stops in engagement with said first-named slide, and cam means associated with the upper slide and engaging said lever for depressing the lever as the superposed slides are moved toward said first-named slide.

7. A hinging machine for metal boxes comprising a base plate having a slot, two superposed slides mounted to reciprocate in said slot both independently and together, a work holder, a wire holder, and means on the work holder cooperating with the ends of the slides during reciprocation of the latter for cutting a wire into proper length to form a hinge, bending it into a hinge, forcing it into an article, and clinching its ends into said article, substantially as described.

8. A hinging machine for metal boxes comprising a base plate having a slot, two superposed slides mounted to reciprocate in the slot independently and together, a wire holder, a work holder having a slide, a series of stops projectible above the base plate during a portion of the movement of the superposed slides, one of said stops adapted to engage and hold said first-named slide against movement and the other to extend into the path of movement of said superposed slides and cooperating with said superposed slides to form a hinge from a wire held by the wire holder, and means on the work holder co-operating with the ends of the superposed slides in the movement of the latter in one direction to force the ends of said wire into an article held by the work holder and forming an upset portion in said article adjacent to the ends of the wire.

In testimony whereof we have signed our names to this specification.

WILLIAM GEORGE HUXTABLE.
REGINALD ERNEST GOLD.